(12) United States Patent
Westerhof et al.

(10) Patent No.: US 12,162,172 B2
(45) Date of Patent: *Dec. 10, 2024

(54) STAGED ADVICE FOR OPTIMAL USE OF A SHAVING DEVICE

(71) Applicant: KONINKLIJKE PHILIPS N.V., Eindhoven (NL)

(72) Inventors: Willem Auke Westerhof, Drachten (NL); Johannes Antonius Jansen, Utrecht (NL); Lennart Jakob Stapelkamp, Groningen (NL); Willem Henderikus Veldhuis, Veendam (NL); Linda Jacoba Martina Van Den Bedem, Eindhoven (NL); Dylan Evans, Amsterdam (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/542,611

(22) Filed: Dec. 6, 2021

(65) Prior Publication Data

US 2022/0088808 A1 Mar. 24, 2022

Related U.S. Application Data

(63) Continuation of application No. 15/751,893, filed as application No. PCT/EP2016/068124 on Jul. 29, 2016, now Pat. No. 11,224,981.

(30) Foreign Application Priority Data

Aug. 24, 2015 (EP) ..................................... 15182122

(51) Int. Cl.
*B26B 19/38* (2006.01)
*B26B 21/40* (2006.01)
(Continued)

(52) U.S. Cl.
CPC ........ *B26B 19/388* (2013.01); *B26B 21/4056* (2013.01); *G06F 3/0482* (2013.01); *G06F 16/9038* (2019.01)

(58) Field of Classification Search
CPC ............... B26B 19/388; B26B 21/4056; G06F 16/9038; G06F 3/0482
See application file for complete search history.

(56) References Cited

U.S. PATENT DOCUMENTS 5,983,502 A * 11/1999 Geertsma ................ B26B 19/14
30/43.6
7,441,336 B2 * 10/2008 Hawes ................ B26B 21/4056
30/44

(Continued)

FOREIGN PATENT DOCUMENTS

CN 204048584 12/2014
EP 2868293 A1 5/2015
(Continued)

OTHER PUBLICATIONS

Frew, et al: Annual Review "Environmental Informatics", Aug. 6, 2012.

(Continued)

*Primary Examiner* — Xuan M Thai
*Assistant Examiner* — Sadaruz Zaman

(57) ABSTRACT

A method, a personal care system and a shaving device for providing staged shaving advice include a processor configured to receive usage data from the shaving device and personal assessment data from a user. The processor is further configured to determine and provide a shaving advice instruction presented to the user based on the usage data and/or the personal assessment data.

17 Claims, 1 Drawing Sheet

(51) Int. Cl.
*G06F 3/0482* (2013.01)
*G06F 16/9038* (2019.01)

(56) References Cited

U.S. PATENT DOCUMENTS

| | | | | |
|---|---|---|---|---|
| 7,913,392 | B2 * | 3/2011 | Rozenkranc | B26B 19/3886 |
| | | | | 30/32 |
| 8,089,227 | B2 * | 1/2012 | Baertschi | B26B 21/405 |
| | | | | 318/128 |
| 8,296,686 | B1 * | 10/2012 | Tedesco | G16H 40/63 |
| | | | | 715/865 |
| 9,108,327 | B1 * | 8/2015 | Brooks | B26B 19/388 |
| 9,821,479 | B2 * | 11/2017 | Zuidervaart | B26B 21/4056 |
| 9,849,598 | B2 * | 12/2017 | Damkat | B26B 19/388 |
| 10,131,061 | B2 * | 11/2018 | Krans | B26B 21/4056 |
| 10,357,092 | B2 * | 7/2019 | Kustra | A45D 24/36 |
| 10,576,647 | B2 * | 3/2020 | Uit De Bulten | B26B 21/4081 |
| 10,946,218 | B2 * | 3/2021 | Vahala | A61N 5/10 |
| 11,224,981 | B2 * | 1/2022 | Westerhof | B26B 19/388 |
| 11,241,804 | B2 * | 2/2022 | Godlieb | B26B 19/16 |
| 11,464,570 | B2 * | 10/2022 | Yan | A61B 34/10 |
| 2002/0088121 | A1 * | 7/2002 | Jacobsen | B26B 21/4056 |
| | | | | 30/34.05 |
| 2008/0109973 | A1 * | 5/2008 | Farrell | A61C 17/224 |
| | | | | 15/4 |
| 2010/0281636 | A1 * | 11/2010 | Ortins | A46B 15/001 |
| | | | | 15/4 |
| 2011/0197726 | A1 * | 8/2011 | Kraus | B26B 19/046 |
| | | | | 83/13 |
| 2012/0227554 | A1 * | 9/2012 | Beech | B26B 19/382 |
| | | | | 83/13 |
| 2013/0250122 | A1 * | 9/2013 | Binder | B26B 19/3873 |
| | | | | 348/162 |
| 2014/0137883 | A1 * | 5/2014 | Rothschild | B26B 19/388 |
| | | | | 132/200 |
| 2014/0345142 | A1 * | 11/2014 | Damkat | B26B 21/405 |
| | | | | 30/34.2 |
| 2015/0217465 | A1 * | 8/2015 | Krenik | B26B 19/388 |
| | | | | 700/90 |
| 2016/0262521 | A1 * | 9/2016 | Kustra | A45D 27/00 |
| 2018/0236675 | A1 * | 8/2018 | Westerhof | B26B 21/4056 |
| 2019/0224863 | A1 * | 7/2019 | Robinson | G06F 3/0346 |
| 2019/0224864 | A1 * | 7/2019 | Robinson | G06F 3/017 |

FOREIGN PATENT DOCUMENTS

| | | |
|---|---|---|
| EP | 3341167 B1 | 10/2021 |
| JP | 2005352866 | 12/2005 |
| JP | 2007133518 | 5/2007 |
| WO | 2015067489 | 5/2015 |
| WO | 2017/032547 A1 | 3/2017 |

OTHER PUBLICATIONS

Hudson's FTM Resource Guide—"All About Shaving" http://www.ftmguide.org/shaving.html.
"20 Expert Shaving Tips for Men", published on Oct. 30, 2013 http://www.fashionbeans.com/2013/20-best-mens-shaving-tips.

* cited by examiner

STAGED ADVICE FOR OPTIMAL USE OF A SHAVING DEVICE

CROSS-REFERENCE TO RELATED APPLICATIONS

This application is a continuation of U.S. application Ser. No. 15/751,893, filed on Feb. 12, 2018, which is the U.S. National Phase application under 35 U.S.C. § 371 of International Application No. PCT/EP2016/068124, filed on Jul. 29, 2016, which claims the benefit of European Application No. 15182122.0 filed on Aug. 24, 2015. These applications are hereby incorporated by reference herein.

FIELD OF THE INVENTION

The invention relates to a personal care system and shaving device, in particular to the provision of personalized advice related to the shaving device handling and shaving routines in a step-by-step manner.

BACKGROUND OF THE INVENTION

Although significant technological progress has been made in the last decades with regard to electrical shaving devices, e.g., pressure adaptation, flexible shaving heads etc., optimal shaving results are often not reached due to non optimal usage of the shaving device. Non optimal usage of a shaving device may result in skin irritation, sometimes even in severe skin irritation. From user testing and observation, it has been learned that a main reason for non optimal usage of the shaving device is caused by improper tool handling and a lack of knowledge regarding shaving in general.

Hence, proper guidance before, during and after shaving is required. Depending on the specific user, his knowledge, his skin condition etc., the relevance and importance of multiple elements of guidance may differ significantly.

From US 2002/0088121 A1 a shaving device is known which uses sensor data in order to analyze proper usage of the shaving device. The shaving device comprises a microphone or accelerometer installed next to the shaving blades in order to detect a shaving signal. The detected signal is filtered to remove noise and analyzed by artificial intelligence logic. Signals from the accelerometer may be used to determine whether the user shaves at the correct speed. The microphone may help indicate whether the shaving blade has become dull or more shaving cream should be used. Thus, whenever a shaving signal is detected that is outside a proper usage range, the shaving device may provide an indication to the user.

DE 10 2006 004 675 A 1 discloses an electric shaver having two hair-cutting units arranged in parallel on a shaving head, which can be pivoted about a pivot axis by means of an actuating member. This known shaver comprises first and second pressure sensors which, during operation, measure a pressure force exerted by the skin on a respective one of the two hair-cutting units. The shaver further comprises a microcontroller for receiving output signals of the pressure sensors and for controlling an angular position of the shaving head about the pivot axis by controlling the actuating member based on the output signals of the pressure sensors. The microcontroller controls the actuating member such that the measured pressure forces on the two hair-cutting units have a desired relationship. The shaver may further comprise an input member by means of which the user can select a degree of skin sensitivity. The microcontroller controls the actuating member also based on the selected degree of skin sensitivity.

However, in order to be comprehensive and actionable, guidance elements should be presented in a staged (step by step) manner. In order to have as much impact as possible, the elements with highest relevance and effect need to be given first. However, as there are multiple beard and skin types, different environmental conditions, different lifestyles and skills, it is not possible to generate a single standard list with prioritized advice.

SUMMARY OF THE INVENTION

It is an object of the present invention to provide an actionable and comprehensible shaving advice that is most relevant to a user at a specific moment in time, taking into account the specific physiology, environment, habits and context, in order to achieve the best possible shaving result.

The object is achieved by a method of providing staged shaving advice, a computer program, a personal care system and a shaving device according to various representative embodiments described herein.

Accordingly, upon a plurality of input data gathered by the shaving device and/or from further sources, e.g., input from the user or the internet, the invention provides a personalized prioritization of shaving advice instructions, wherein a selected shaving advice instruction is presented to the user in a staged or step by step manner, wherein subsequent advice may be adapted upon detection of changes in the usage and/or reported feedback.

In an aspect of the invention, there is provided a method of providing staged shaving advice. The method comprises the steps of:

receiving personal assessment data provided by a user,
receiving usage data from a shaving device, said usage data comprising timing information related to a shaving session,
determining a shaving advice instruction, among a plurality of shaving advice instructions, based on an analysis of the personal assessment data and the usage data, using logic associating shaving related data with corresponding shaving advice instructions, and
providing the determined shaving advice instruction to the user via a user interface.

Personal assessment data may comprise information relating to skin sensitivity, age, hair type, uneven skin, ingrowing hair, difficulties to catch hair, etc., which the user may provide via a user interface in response to a questionnaire presented via the user interface. Such a user interface may be a graphical or acoustic user interface. The personal assessment data may also be downloaded from a database in case the user already provided the data in the past. In particular the information relating to skin sensitivity of the user, combined with said timing information, is relatively important to determine the shaving advice instruction to be provided to the user. The timing information from the shaving device may comprise any of: usage count information, including zero counts indicating that the shaving device is used for the first time and there is no further usage information present, duration of a shaving session, frequency of shaving sessions, interruption during shaving sessions which may be an indication of problems or false use, time of the day, etc. The logic is used to determine a personalized or prioritized shaving advice instruction, among a plurality of available shaving advice instructions, based on an analysis of the personal assessment data and the usage data. This logic may use any kind of algorithm or look-up table which enables an association of shaving related data with corresponding shaving advice instructions. The determined shaving advice instruction is subsequently provided to the user via a user interface. This user interface may either be the same graphical or acoustic user interface as the user interface for providing the personal assessment data, or may be a different user interface. Accordingly, the user may be provided with the most valuable personalized advice at a time such that he may concentrate on the advice and improve the shaving experience step by step. In this way, the advice given is usable for the user, very comprehensive, well memorable, and actionable.

In an embodiment of the present invention, the method further comprises storing the usage data as usage history. The step of determining the shaving advice instruction among the plurality of shaving advice instructions is further based on an analysis of the usage history. Providing the usage history may improve the determination of the most valuable shaving advice instruction among the plurality of shaving advice instructions in that the logic may determine patterns in usage and incorporate those in the determination approach.

In an embodiment of the present invention, the method further comprises receiving user feedback data. The step of determining the shaving advice instruction among the plurality of shaving advice instructions is further based on an analysis of the user feedback data. The user feedback data may be provided right after a shaving session again via a user interface or after a certain period of time if it relates to long term effects. After a shaving session, the user may be provided with a feedback questionnaire comprising one or more questions relating to the shaving experience or the helpfulness of the shaving advice instructions already presented. Providing user feedback data may significantly impact the determination of the shaving advice instruction.

In an embodiment of the present invention, the method further comprises generating an advice history comprising information about a first shaving advice instruction. The step of determining the shaving advice instruction among the plurality of shaving advice instructions is further based on an analysis of the advice history. The shaving advice instructions already presented may determine a set of shaving advice instructions to be analyzed, or may determine a particular question to be asked to the user. An advice already presented may be down-weighted or blocked for a given period of time in order to avoid providing the same advice too often and thereby risking annoying the user. Further, the advice list may help to present a sequence of related shaving advice instructions in a meaningful order. In other words, the advice history provides a context for determining the next shaving advice instruction to be presented.

In an embodiment of the present invention, the method further comprises receiving environmental information via an open application programming interface. The step of determining the shaving advice instruction among the plurality of shaving advice instructions is further based on an analysis of the environmental information. In order to determine the most valuable advice it may help to further incorporate environmental information like humidity, sunshine intensity, wind as well as pollution levels and so on. Such data may be stored and optionally pre-categorized in a cloud or on a server and requested or accessed via the internet if needed.

In an embodiment of the present invention, the method further comprises receiving experience reports from other users, for example via an open application programming interface. The step of determining the shaving advice instruction among the plurality of shaving advice instructions is further based on an analysis of the experience reports. In order to determine the most valuable advice it may help to further incorporate data from other users with similar usage and/or personal assessment data. Such data may be stored and optionally pre-categorized in a cloud or on a server and requested or accessed via the internet if needed.

In an embodiment of the present invention, the usage data further comprises pressure data and/or motion data measured by the shaving device. The shaving device may have one or more sensors near or inside a shaving head unit, which detect the pressure and/or the motion, e.g., speed, rotation, or angular position, applied by the user during shaving. This information may be exploited to further improve the determination of the advice.

In a further aspect of the invention, there is provided a computer program executable in a processing unit, the computer program comprising program code means for causing the processing unit to carry out a method as defined in the previous aspect of the invention when the computer program is executed in the processing unit.

In a further aspect of the invention, there is provided a personal care system comprising a shaving device comprising a processing unit and a communication interface adapted to communicate data with an external device and/or network; a smart device comprising a processing unit, a data storage, a communication interface adapted to communicate data with an external device and/or network, a user interface, and a display unit; and logic associating shaving related data with corresponding shaving advice instructions. Further, the smart device is adapted to receive, via the user interface, personal assessment data provided by the user, and to receive, via the communication interface, usage data from the shaving device, said usage data comprising timing information related to a shaving session. The processing unit of the smart device is further adapted to determine a shaving advice instruction, among a plurality of shaving advice instructions, based on an analysis of the personal assessment data and the usage data using the logic, and to provide the determined shaving advice instruction via the user interface.

Personal assessment data may comprise information relating to skin sensitivity, age, hair type, etc., which the user may provide via the user interface of the smart device in response to a questionnaire presented via the user interface. The user interface may be a graphical or acoustic user interface. The personal assessment data may also be downloaded from a database in case the user already provided the data in the past. In particular the information relating to skin sensitivity of the user, combined with said timing information, is relatively important to determine the shaving advice instruction to be provided to the user The timing information provided by the shaving device may comprise any of: usage count information, including zero counts indicating that the shaving device is used for the first time and there is no further usage information present, duration of a shaving session, frequency of shaving sessions, interruption during shaving sessions which may be an indication of problems or false use, time of the day, etc. The logic is used to determine a shaving advice instruction among a plurality of shaving advice instructions. This logic may use any kind of algorithm or look-up table which enables an association of shaving related data with corresponding shaving advice instructions. The determined shaving advice instruction is subsequently provided to the user via a user interface. This user interface may either be the same graphical or acoustic user interface as the user interface for providing the personal assessment data, or may be a different user interface. The smart device may be any device providing functionality to communicate data with other devices and process data in accordance with certain instructions, e.g., smart phone, tablet, etc. Furthermore, future systems may use smart mirrors which may support different personal care systems and/or entertainment systems.

In an embodiment of the present invention, the smart device is adapted to save the usage data as usage history, and the processing unit of the smart device is further adapted to determine the shaving advice instruction, among the plurality of shaving advice instructions, further based on the usage history. The smart device may store the received usage data as history in the data storage of the smart device or in a remote location, e.g., a database hosted by a server or in a cloud. That way the data may be saved in case of loss or malfunction of the smart device. Furthermore, the data may be provided to other users, e.g., by categorizing the data and generating certain shaving types/characters.

In an embodiment of the present invention, the shaving device comprises an internal storage adapted to store the usage data for periods in which the shaver is not communicatively coupled to the smart device. In case the smart device is not in communication with the shaving device, e.g., when the smart device is not present, not charged, or there is no communication possible due to malfunction of the communication interface, etc., the shaving device may store the usage information in the internal storage and sync the usage history with the smart device the next time the smart device is in communication with the shaving device.

In an embodiment of the present invention, the smart device is further adapted to receive, via an open application programming interface, environmental information and/or experience reports from other users. The processing unit of the smart device is further adapted to determine the shaving advice instruction, among the plurality of shaving advice instructions, further based on an analysis of the environmental information and/or the experience reports. In an embodiment of the present invention, the shaving device further comprises a sensor adapted to measure pressure and/or motion applied to a shaving head unit of the shaving device, wherein the shaving device is adapted to provide data, provided by the sensor, as usage data to the smart device. The sensors may be implemented right below the shaving head unit or in other parts of the shaving device. There may be further sensors such as acoustic or visual sensors which may provide further input to analyze the shaving device handling.

In a further aspect of the invention, there is provided a shaving device comprising a processing unit, a data storage, and a user interface adapted to receive input from or provide output to a user. The shaving device is adapted to receive, via the user interface, personal assessment data provided by the user, and to record usage data as usage history in the data storage, said usage data comprising timing information related to a shaving session. The processing unit is adapted to determine a shaving advice instruction, among a plurality of shaving advice instructions, based on an analysis of the personal assessment data and the usage data, using logic associating shaving related data with shaving advice instructions, and to provide the determined shaving advice instruction via the user interface.

Personal assessment data may comprise skin sensitivity, age, hair type, etc., which the user may provide via the user interface in response to a questionnaire presented via the user interface. The user interface may be a graphical or acoustic user interface. It can be provided by the shaving device itself or only be controlled by the shaving device but displayed on a smart mirror or another display or interactive device which is communicatively coupled to the shaving device. The personal assessment data may also be downloaded from a database in case the user already provided the data in the past. In particular the information relating to skin sensitivity of the user, combined with said timing information, is relatively important to determine the shaving advice instruction to be provided to the user. The timing information from the shaving device may comprise any of: usage count information, including zero counts indicating that the shaving device is used for the first time and there is no further usage information present, duration of a shaving session, frequency of shaving sessions, interruption during shaving sessions which may be an indication of problems or false use, time of the day, etc. The logic is then used to determine a shaving advice instruction among a plurality of shaving advice instructions. This logic may use any kind of algorithm or look-up table which enables an association of shaving related data with corresponding shaving advice instructions. The determined shaving advice instruction is subsequently provided to the user. The determined advice may be presented via a user interface which may be the same as the input user interface or another interface. For example, the input user interface may be a graphical user interface while the output user interface may be acoustic. Like the personal care system according to the invention, the shaving device according to the invention may be connected to a remote server or cloud via the internet to exchange data. For this purpose, the shaving device may comprise a communication interface, which preferably enables both short signal communication, such as Bluetooth, as well as wireless or wired internet access.

It shall be understood that the method of providing staged shaving advice, the computer program, the personal care system and the shaving device comprise similar and/or identical representative embodiments described herein.

It shall be understood that a preferred embodiment of the present invention can also be combinations of the various representative embodiments described herein.

These and other aspects of the invention will be apparent from and elucidated with reference to the embodiments described hereinafter.

DETAILED DESCRIPTION OF EMBODIMENTS

Figure 1:
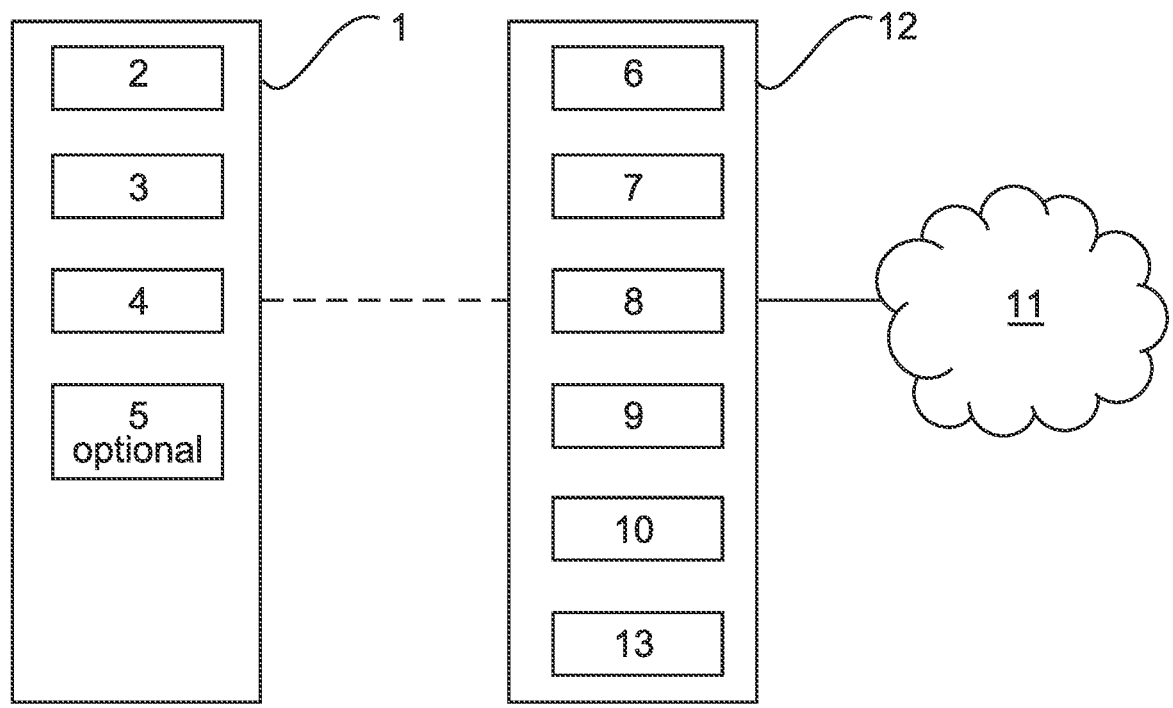
FIG. 1 shows a preferred embodiment of the present invention.

FIG. 1 shows a system comprising a shaving device 1 connectable via a communication interface 4 with a respective communication interface 8 of a smart device 12. The connection may be wireless or wired, preferably the connection is a short-range wireless connection such as Bluetooth. The smart device may be any electronic device capable of running software applications, e.g., smart phone, tablet etc. Preferably, the smart device should also be capable of wired or wireless communication with other devices especially via the internet 11, e.g., communicating with any server or cloud.

The shaving device 1 comprises a processing unit 2 to control the shaving device. Further, it may be used to process sensor data in case the shaver is optionally equipped with sensors, such as pressure or motion sensors. Preferably, a data storage 3 in which data from the processing unit may be stored before transfer to the smart device 12 is provided. In this way, usage history data from the shaver may, be stored in the shaving device 1 even if it is not connected to the smart device 12 during shaving. The data can be read out the next time the smart device 12 is in connection with the shaving device 1. Hence, no usage data is lost. The smart device 12 also comprises a user interface 9 and the display unit 13. The user interface 9 and the display unit 13 may be connected, for instance as a touch screen that allows displaying interactive content and receiving user input by a user touching on a particular element displayed on the screen. Alternatively, or additionally, the user interface 9 may be provided to receive acoustic input and/or provide acoustic output. Furthermore, the smart device 12 comprises a processing unit 6 and a data storage 7. The processing unit is used to process any data provided by the user and/or shaver to associate and weight shaving related data with corresponding shaving advice instructions. The processing unit may use logic 10 to determine an appropriate saving advice instruction. The logic may be comprised in the smart device, in the shaver or in a remote device such as a central server. Based on the provided input data, the logic determines a shaving advice instruction among a plurality of shaving advice instructions and outputs the shaving advice instruction. A possible implementation of such logic may be an algorithm in which different (combinations of) answers given by the user and data provided by the shaver are weighted and added to calculate an advice value for each shaving advice instruction. The questions/answers differ for each shaving advice instruction. These shaving advice instructions are categorized and per category the advice with the highest advice value is given to the user. If equal advice values are determined, the safest advice is given to the user. Another possibility of implementing the logic is to use a look-up table which correlates shaving advice instructions to combinations of input data. In other words: if this data is provided, then this advice should be given. Such a look-up table may be stored either in the smart device 12 or even on a server the smart device 12 has access to. Another alternative implementation may represent a kind of flowchart meaning that the determination method does not change but the input is preconditioned differently. That is, the questions a user is asked and the content/advice the user receives are dependent on the user's position in the flow. If a certain set of conditions is not fulfilled (like certain feedback questions are not answered, or the shaver has not been synced for a while, thus no shaver data is provided for a certain time) the user will not move in the flow. However, as pointed out, any logic may be implemented that is able to provide priorities to shaving advice instructions based on the provided input data.

Upon first usage of the system, e.g., activation of the shaving device 1, the user is asked via a set of questions displayed by the smart device 12 what the user's typical shaving issues are, e.g.:

- Skin sensitivity, on a scale from not- to very sensitive, for several beard areas, but at least for the neck and around the mouth
- Difficult to catch hairs
- In-growing hairs
- Pimples
- Uneven skin (due to acne from the past)
- Dry, tight skin This input will be asked only at first usage but can be updated whenever the user considers this to be necessary or on a routine basis.

The shaving device 1 is adapted to record usage data such as:

- a last time the person actually shaved, to assess beard length,
- an average shaving frequency (how often per week),
- an average duration of a shave (to assess efficiency of shaving, optional together with beard density, beard coverage and beard length),
- a shaving device's on/off status (to determine pre-shave, during shave or aftershave status of user).

Besides timing information, e.g., first usage, duration of a shave, frequency of a shave, time of the day, etc., the shaving device 1 may comprise one or more sensors 5, which provide further data regarding for example the pressure and/or motion of a shaving device 1, especially the head unit, during usage. A further optional data source is data from open API's, such as for instance cloud data:

- Temperature and air humidity (for advice on wet/foam—or dry usage)
- Pollution (for specific pre-shave cleansing advice)

Based on the information, a variety of shaving advices could be given, for instance:

Pre-Shave Advice
- To minimize friction, consider using wet shaving with foam for sensitive skin, using your rotary shaver.
- Consider pre-trimming before you shave.
- Make sure your skin is dry, if you prefer a dry shave.

During Shave Advice
- At your sensitive areas, use gentle pressure only, and keep the number of strokes limited.
- At your highly sensitive areas, use minimal pressure only, do not stretch, and keep the number of strokes to a minimum.
- Do not aim for optimal closeness in the areas where you have in-growing hairs.
- Approach difficult hairs from multiple directions while using only little pressure.
- On the areas where you have pimples, use minimal pressure only, do not stretch, and keep the number of strokes to a minimum.
- For the areas where your skin is uneven, use gentle pressure only, and keep the number of strokes limited.
- Use the "sensitive" speed setting, for a gentle shave.
- Use small circular movements, for effectively catching those hairs.
- Apply gentle pressure at the start. Upon finishing apply more pressure for optimal closeness. For sensitive areas, follow the specific pressure advice.
- Try movements against the grain for extra closeness. Do not do this in sensitive areas.
- Stretch your skin to raise your hairs for more effective shaving and extra closeness. Do not do this in sensitive areas.

After-Shave Advice
- Use a soothing, alcohol free after-shave balm to calm your skin
- Shave every other day, to give your skin recovery time
- When your skin allows it, shave every day, to prevent hairs growing in.
- After shaving, use a moisturizing lotion to hydrate your skin
- Gently cleanse your face after shaving, using the cleansing brush. Avoid the areas that are irritated after shaving.

The plurality of shaving advice instructions is preferably stored in the data storage 7 of the smart device 12. The logic determines, based on the provided input data, and optionally on further data like reported progress/feedback on the specific issues (issue can be solved, become more or less severe, (re-)appear), usage history, e.g., sessions become shorter, have fewer interruptions, user now shaves at another time of the day, etc., a shaving advice instruction among a plurality of shaving advice instructions having the highest priority to the user. The shaving advice instruction may either be provided before, during or after shaving or there may be one shaving advice instruction for each period. In the below example, assuming a first use (based on first use of the system and no recorded shaving sessions) of the shaving device 1 for a person with very sensitive skin areas, but also other specific issues, the most relevant shaving advice instruction for this person for this specific shave would be:

At your highly sensitive areas, use minimal pressure only, do not stretch your skin, and keep the number of strokes to a minimum.

After the person has turned off the shaving device 1, the system analyses whether the usage was long enough to be recognized as a shave. In case the decision is positive, a corresponding after shave advice may be given, for instance:

Use a soothing, alcohol free after shave balm to calm your skin

The system may also ask the user, via the user interface 9, how the skin feels after this shave and record the answer provided via the user interface. Assuming the advice already improved the shaving result substantially, and assuming the person shaves again after for instance 3 days or more, the system may recalculate the priorities for each of the plurality of shaving advice instructions taking into account the 3 days or more of non-usage and the feedback provided by the user after the first shave, such that the next advice provided when activating the system before the next shave may be:

Consider pre-trimming before you shave.

After the person has turned off the shaving device after finishing shaving, the new after-shave advice line would be:

When your skin allows it, shave every day, to prevent hairs growing in.

In this way, the advice given is very comprehensive, well memorable, and actionable. All advice given previously will be stored in a list, e.g., a smart routine that a user can always read back at his convenience.

The user improves the shaving performance step by step, shave by shave until an optimal shaving result is achieved.

Figure 2:
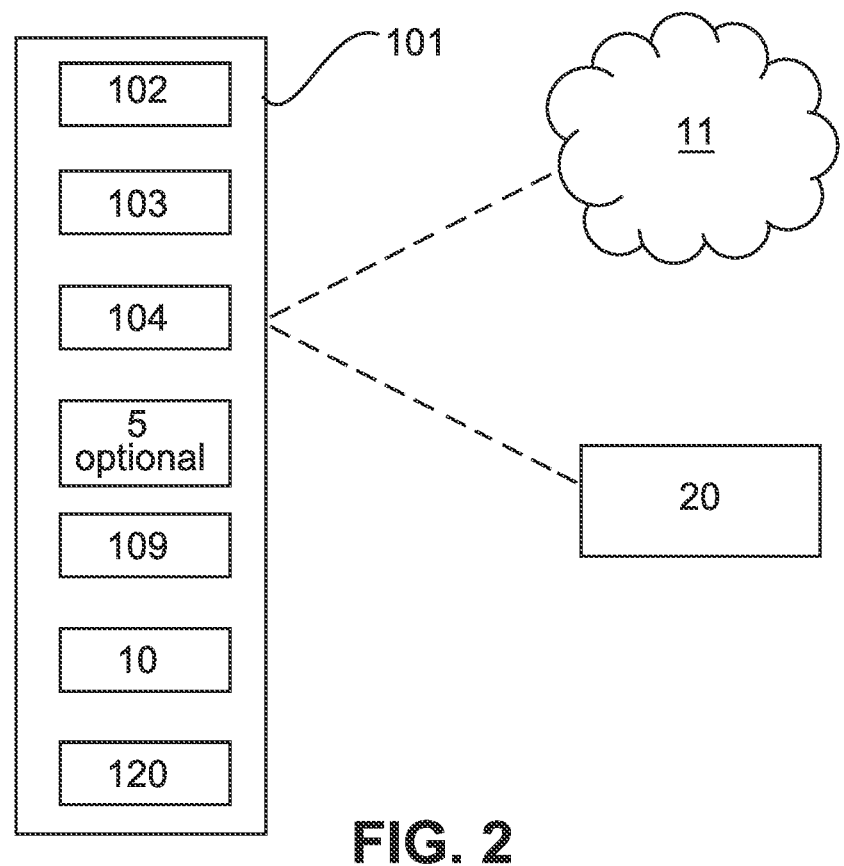
FIG. 2 shows a second preferred embodiment of the present invention.

FIG. 2 shows a second preferred embodiment in which parts of the functionality of the smart device of the embodiment shown in FIG. 1 are included in the shaving device 101 having a processing unit 102 a data storage 103. The following description will thus only describe the delta to the embodiment of FIG. 1. The communication interface 104 of the shaving device 101 may enable communication via short range communication such as Bluetooth, for instance with an external display 20. Furthermore, the communication interface 104 may also enable communication with the internet 11, either wired or wireless. The user interface 109 is integrated in the shaving device 101 and may comprise a visual display unit 120. Alternatively, or additionally, the user interface may be an acoustic interface. Hence, the user may be presented with a variety of selection options concerning beard type, skin sensitivity and the user may select one of the options for instance by saying a number. The advice may as well be given in acoustic form, either before, during or after shaving.

Furthermore, the shaving device 101 may send the shaving advice instruction to the visual display unit 120 contained in an external electronic device, such as for instance an entertainment device such as a radio or another personal care system providing a display or a smart watch or a smart mirror which may have a section to display content. In an alternative embodiment of the shaving device 101, the visual display unit 120 might be a projector unit adapted to project the advice on a mirror that a person shaving is looking into.

The invention claimed is:

1. A method of providing staged shaving advice, the method comprising:
   receiving usage data from a shaving device;
   determining a shaving advice instruction, among a plurality of shaving advice instructions, based on an analysis of the usage data, using logic associating shaving related data with corresponding shaving advice instructions; and
   providing the determined shaving advice instruction to a user via a user interface,
   wherein the usage data received from the shaving device comprise timing information related to a shaving session,
   wherein the method further comprises presenting a questionnaire via the user interface and receiving personal assessment data provided by the user and generating an advice history comprising information about a first shaving advice instruction via the user interface in response to the questionnaire, and
   wherein said step of determining the shaving advice instruction among the plurality of shaving advice instructions is based on an analysis of at least one of the personal assessment data, the usage data, and the advice history.

2. The method according to claim 1, wherein the method further comprises storing the usage data as usage history, wherein determining the shaving advice instruction among the plurality of shaving advice instructions is further based on an analysis of the usage history.

3. The method according to claim 1, further comprising receiving user feedback data, wherein determining the user shaving advice instruction among the plurality of shaving advice instructions is further based on an analysis of the feedback data.

4. The method according to claim 1, further comprising receiving environmental information via an open application programming interface, wherein determining the shaving advice instruction among the plurality of shaving advice instructions is further based on an analysis of the environmental information.

5. The method according to claim 1, further comprising receiving experience reports from other users, wherein determining the shaving advice instruction among the plurality of shaving advice instructions is further based on an analysis of the experience reports.

6. The method according to claim 1, wherein the personal assessment data comprises information relating to skin sensitivity of the user.

7. The method according to claim 1, wherein the usage data further comprises pressure data and/or motion data measured by the shaving device.

8. A personal care system comprising:
   a shaving device comprising a processing unit and a communication interface adapted to communicate data with an external device and/or network;
   a smart device comprising a processing unit, a data storage, a communication interface adapted to communicate data with an external device and/or network, a user interface, and a display unit; and logic associating shaving related data with corresponding shaving advice instructions, wherein the smart device is adapted to present a questionnaire and generating an advice history comprising information about a first shaving advice instruction via the user interface, to receive personal assessment data provided by the user via the user interface in response to the questionnaire, and to receive, via the communication interface, usage data from the shaving device, said usage data comprising timing information related to a shaving session, wherein the processing unit of the smart device is further adapted to determine a shaving advice instruction, among a plurality of shaving advice instructions, using the logic and to provide the determined shaving advice instruction via the user interface, and wherein the processing unit is further adapted to determine the shaving advice instruction based on an analysis of at least one of the personal assessment data, the usage data, and the advice history.

9. The personal care system according to claim 8, wherein the smart device is adapted to save the usage data as usage history, and wherein the processing unit of the smart device is further adapted to determine the shaving advice instruction, among the plurality of shaving advice instructions, further based on the usage history.

10. The personal care system according to claim 8, wherein the shaving device comprises an internal storage adapted to store the usage data for periods in which the shaving device is not communicatively coupled to the smart device.

11. The personal care system according to claim 8, wherein:
the smart device is further adapted to receive, via an open application programming interface, environmental information and/or experience reports from other users, and
the processing unit of the smart device is further adapted to determine the shaving advice instruction, among the plurality of shaving advice instructions, further based on an analysis of the environmental information and/or the experience reports.

12. The personal care system according to claim 8, wherein the shaving device further comprises a sensor adapted to measure pressure and/or motion applied to a shaving head unit of the shaving device, and wherein the shaving device is adapted to provide data, provided by the sensor, as usage data to the smart device.

13. A shaving device, comprising:
a processing unit;
a data storage; and
a user interface adapted to receive input from or provide output to a user;

wherein the shaving device is adapted to present a questionnaire via the user interface;

wherein the shaving device is adapted to receive personal assessment data provided by the user via the user interface in response to the questionnaire and generate an advice history comprising information about a first shaving advice instruction, wherein the shaving device is adapted to record usage data as usage history in the data storage, said usage data comprising timing information related to a shaving session;

wherein the processing unit is adapted to determine a shaving advice instruction, among a plurality of shaving advice instructions, using logic associating shaving related data with shaving advice instructions, and to provide the determined shaving advice instruction via the user interface, and wherein the processing unit is further adapted to determine the shaving advice instruction based on an analysis of at least one of the personal assessment data, the usage data, and the advice history.

14. The shaving device according to claim 13, wherein shaving unit is adapted to save the usage data as usage history, and wherein the processing unit of the is further adapted to determine the shaving advice instruction, among the plurality of shaving advice instructions, further based on the usage history.

15. The shaving device according to claim 13, wherein the processing unit comprises an internal storage adapted to store the usage data for periods in which the shaving device is not communicatively coupled to the processing unit.

16. The shaving device according to claim 13, wherein:
the processing unit is further adapted to receive, via an open application programming interface, environmental information and/or experience reports from other users, and
the processing unit is further adapted to determine the shaving advice instruction, among the plurality of shaving advice instructions, further based on an analysis of the environmental information and/or the experience reports.

17. The shaving device according to claim 13, wherein the shaving device further comprises a sensor adapted to measure pressure and/or motion applied to a shaving head unit of the shaving device, and wherein the shaving device is adapted to provide data, provided by the sensor, as usage data to the processing unit.

* * * * *